(12) United States Patent
Boiocchi et al.

(10) Patent No.: US 7,163,039 B2
(45) Date of Patent: Jan. 16, 2007

(54) HIGH-PERFORMANCE TIRE FOR A MOTOR VEHICLE

(75) Inventors: Maurizio Boiocchi, Segrate (IT); Gianfranco Colombo, Concorezzo (IT)

(73) Assignee: Pirelli Pneumatici S.p.A., Milan (IT)

( * ) Notice: Subject to any disclaimer, the term of this patent is extended or adjusted under 35 U.S.C. 154(b) by 4 days.

(21) Appl. No.: 10/029,174

(22) Filed: Dec. 28, 2001

(65) Prior Publication Data

US 2002/0139460 A1  Oct. 3, 2002

Related U.S. Application Data

(63) Continuation of application No. PCT/EP00/05994, filed on Jun. 28, 2000.
(60) Provisional application No. 60/155,142, filed on Sep. 22, 1999.

(30) Foreign Application Priority Data

Jun. 30, 1999   (IT)   ............................. MI99A1447

(51) Int. Cl.
B60C 11/03  (2006.01)
B60C 11/12  (2006.01)
B60C 11/13  (2006.01)

(52) U.S. Cl. .......................... 152/209.8; 152/209.22; 152/209.24; 152/209.27; 152/209.28; 152/DIG. 3

(58) Field of Classification Search ............. 152/209.8, 152/209.9, 209.18, 209.22, 209.24, 209.28, 152/902, 903, 531, 209.27, 209.15, DIG. 3; D12/517–519, 523–524
See application file for complete search history.

(56) References Cited

U.S. PATENT DOCUMENTS

| | | | |
|---|---|---|---|
| 3,512,566 A | | 5/1970 | Verdier |
| 4,299,264 A | * | 11/1981 | Williams ............... 152/209.28 |
| 4,446,901 A | | 5/1984 | Endo et al. |
| 4,617,976 A | | 10/1986 | Kawajiri |
| 4,773,459 A | | 9/1988 | Yamaoka et al. |
| 4,947,911 A | * | 8/1990 | Ushikubo et al. ...... 152/209.27 |
| 5,016,695 A | * | 5/1991 | Kuze et al. |
| 5,371,685 A | | 12/1994 | Bandel et al. |
| 5,529,101 A | * | 6/1996 | Croyle et al. |

(Continued)

FOREIGN PATENT DOCUMENTS

EP    0 357 462    3/1990

(Continued)

OTHER PUBLICATIONS

Pirelli advertisement, Tire Review (two pages), Sep. 1989.*

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A high-performance tire for a motor vehicle includes a carcass and tread band. The tire may be, for example, of the asymmetrical or directional type. The tread band includes a pattern including a central region, first and second shoulder regions, and first and second circumferential grooves. The first circumferential groove divides the first shoulder region from the central region, while the second circumferential groove divides the central region from the second shoulder region. The shoulder regions include shoulder blocks, separated from each other by transverse grooves, but joined to each other along axially inner ends of the shoulder blocks by respective circumferential portions. The central region includes rows of blocks and first and second annular projections or a central annular projection. The blocks of the central region, the shoulder blocks, the circumferential grooves, the transverse grooves, and the one or more annular projections help define the tread pattern.

44 Claims, 7 Drawing Sheets

U.S. PATENT DOCUMENTS

| | | | | | |
|---|---|---|---|---|---|
| 5,746,849 | A | * | 5/1998 | Hutson et al. | 152/209.28 |
| 6,478,062 | B1 | * | 11/2002 | Schomburg | |
| D490,047 | S | * | 5/2004 | Heinen et al. | D12/524 |
| 6,892,775 | B1 | * | 5/2005 | Himuro | 152/209.28 |

FOREIGN PATENT DOCUMENTS

| | | | |
|---|---|---|---|
| EP | 0 524 562 | | 1/1993 |
| EP | 0 611 667 | | 8/1994 |
| EP | 627332 | * | 12/1994 |
| EP | 790143 | * | 8/1997 |
| GB | 1 212 795 | | 11/1970 |
| JP | 60-193704 | * | 10/1985 |
| JP | 63-61606 | * | 3/1988 |
| JP | 63-061606 A | | 3/1988 |
| JP | 64-36505 | * | 2/1989 |
| JP | 4-143106 | * | 5/1992 |
| JP | 6-106916 | * | 4/1994 |
| JP | 08-11508 | * | 1/1996 |
| JP | 08-011508 A | | 1/1996 |
| JP | 08-197912 | * | 8/1996 |
| JP | 11-1105 | * | 1/1999 |
| JP | 11-91314 | * | 4/1999 |
| LU | 55 106 | | 8/1968 |

OTHER PUBLICATIONS

T. Akihiro, "Radial Tyre for Truck and Bus", Patent Abstracts of Japan of JP 61 016109, (Jan. 24, 1986), (Abstract Only).

Product Advertisement for "ECSTA KU19" tire dated Jun. 9, 2004, from http://www.tireack.com/ (3 pages), Already in English.

* cited by examiner

HIGH-PERFORMANCE TIRE FOR A MOTOR VEHICLE

This application is a continuation application of International Application No. PCT/EP00/05994, filed Jun. 28, 2000, in the European Patent Office; additionally, Applicants claim the right of priority under 35 U.S.C. § 119(a)–(d) based on patent application Ser. No. MI99A 001447, filed Jun. 30, 1999, in the Italian Patent Office; further, Applicants claim the benefit under 35 U.S.C. § 119(e) based on prior-filed, now abandoned provisional application No. 60/155,142, filed Sep. 22, 1999, in the U.S. Patent and Trademark Office the contents of all of which are relied upon and incorporated herein by reference.

BACKGROUND OF THE INVENTION

1. Field of the Invention

The present invention relates to a high-performance tire for a motor vehicle.

2. Description of the Related Art

British Patent Document No. GB 1,212,795 discloses a radial tire having a tread provided with a central circumferential groove, two circumferential side grooves, one on each side of the central groove, disposed substantially equidistantly between the central groove and the edges of the tread, and transverse grooves extending from opposite side of the central groove toward, but not as far as, one of the side grooves.

In said tread, the circumferential side grooves are flanked on both sides by circumferential ribs.

The invention disclosed by this document has the aim of reducing the stiffness of the tread.

U.S. Pat. No. 4,446,901 discloses a heavy-duty pneumatic radial tire comprising a carcass of a substantially radial construction composed of at least one rubberized ply layer containing cords embedded therein and a belt superimposed about said carcass for stiff reinforcement beneath a tread and composed of at least two rubberized ply layers each containing metal cords embedded therein, said metal cords of which being crossed with each other at a relatively small angle with respect to the circumferential direction of the tire, and said tread being provided with a plurality of continuous or discontinuous zigzag circumferential ribs defined along the widthwise direction of the tire by at least three substantially zigzag main grooves extending circumferentially of said tread, said main grooves comprising one or a pair of central circumferential grooves located at a substantially central region of said tread and a pair of outside circumferential grooves defining each of the outermost ribs of said tread. In this tire, the central circumferential groove has such a symmetrical cross-sectional shape with respect to a centerline of said groove that an inclination angle of a groove wall of said groove with respect to a normal line drawn from an outer surface of said tread and passing an edge of said groove in the cross-section perpendicular to said groove wall is made relatively large in a region extending from the groove bottom to at least 50% of groove depth, and the outside circumferential groove has such an unsymmetrical cross-sectional shape with respect to a centerline of said groove that an inclination angle of an outer groove wall of said groove in the rotation axial direction of the tire is made relatively large and an inclination angle of an inner groove wall of said groove in a region extending from the outer surface of said tread to at least 10% of groove depth is made smaller than that of said outer groove wall.

U.S. Pat. No. 4,773,459 discloses a low-section tire having a tread pattern comprising 5 a plurality of main grooves substantially extending in a circumferential direction of the tire in parallel to each other and a plurality of transverse grooves intersecting the main circumferential grooves at an inclination angle also in parallel to each other, said transverse grooves are formed in upwardly-sloping, raised-bottom fashion along a longitudinal direction thereof between two main grooves, bottoms of said transverse grooves are raised in a substantially equilateral-triangle shape in cross-section in such a way that a depth of said transverse grooves is shallowest at substantially the middle portion of each transverse groove and the deepest at the bottom of said main circumferential groove.

SUMMARY OF THE INVENTION

In the present description and in the claims, the term "continuous track" denotes a portion of tread band of a tiredelimited continuously on only one of its sides, and the term "sipe" denotes a notch having a width of not more than 1 mm.

None of said documents recognizes the problem of the "saw tooth" wear arising in a tire, particularly on the edges of the transverse grooves of the shoulders. This problem has been resolved by a high-performance tire according to claim 1.

In one embodiment, said continuous lateral wall of said circumferential groove has an inclination in the range from approximately 14° to 24° with respect to said centre-line axis and a bottom radius R within a range from approximately 2 mm to 5 mm, while said facing lateral wall has an inclination in the range from approximately 3° to 10° with respect to said centre-line axis and a bottom radius R1 in the range from approximately 4 mm to 7 mm.

Advantageously, said continuous lateral wall of said circumferential groove has an inclination of approximately 19° with respect to said centre-line axis and a bottom radius R of approximately 3.5 mm, while said facing lateral wall has an inclination of approximately 5° with respect to said centre-line axis and a bottom radius R1 of approximately 5 mm.

Preferably, at least one of said shoulder blocks has a sipe which is approximately transverse with respect to an equatorial plane.

Advantageously, said central region comprises at least a first and a second circumferential row of central blocks, delimited by one of said circumferential grooves and by another deep circumferential groove.

Preferably, said central blocks are of approximately rhomboid shape.

Advantageously, said central blocks are approximately cusp-shaped.

Preferably, said central region also comprises a third circumferential row of inner central blocks, adjacent to an annular projection, said third row of blocks and said projection being delimited by said other circumferential grooves.

Advantageously, said inner central blocks have an approximately semi-parabolic shape.

The tireaccording to the invention provides high performance, both when it is new and when it is partially worn. This high performance consists primarily in a high plastic and acoustic travelling comfort and a high resistance to aquaplaning, both in straight travel and when cornering, together with good handling properties on dry and wet ground.

In particular, the presence of a continuous track which joins the shoulder blocks reduces the appearance of the typical irregular and premature deformations known as "saw tooth" wear phenomenon on the edges of the transverse grooves and of the adjacent circumferential groove during the rolling of the tire, and thus improves its mileage yield.

Moreover, the invention makes it possible to control certain design characteristics of a tire, such as the possibility of optimizing the flow and consequent distribution of the tread compound along the crown of the tire.

Therefore, the invention makes it possible to control certain behaviour characteristics of a tire, particularly a high-performance tire, such as the possibility of controlling the wear degree and rate of the tread band in use, as well as the roadholding in both dry and wet conditions, the plastic comfort and/or quietness of running in severe conditions of use at high running speeds.

BRIEF DESCRIPTION OF THE DRAWINGS

Further characteristics and advantages of the invention will now be illustrated with references to embodiments illustrated by way of example and without restriction in the attached figures, in which.

DETAILED DESCRIPTION OF THE PREFERRED EMBODIMENTS

Figure 1:
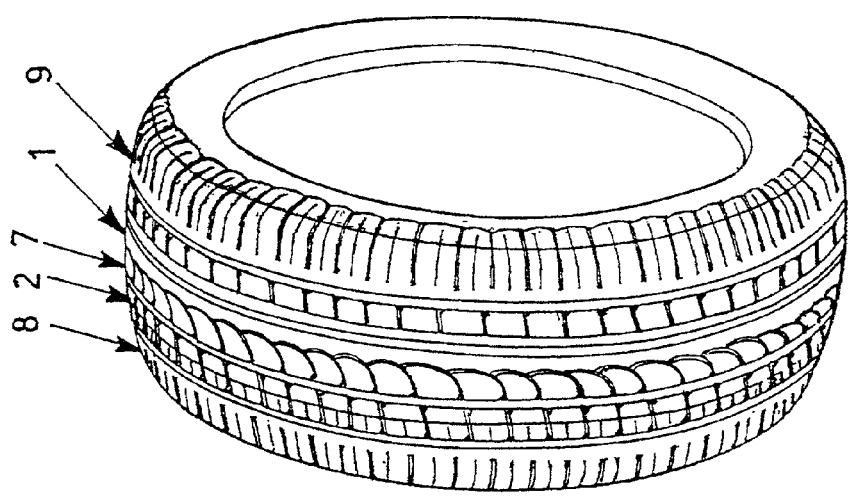
FIG. 1 is a perspective view of a tire according to the invention.
Figure 2:
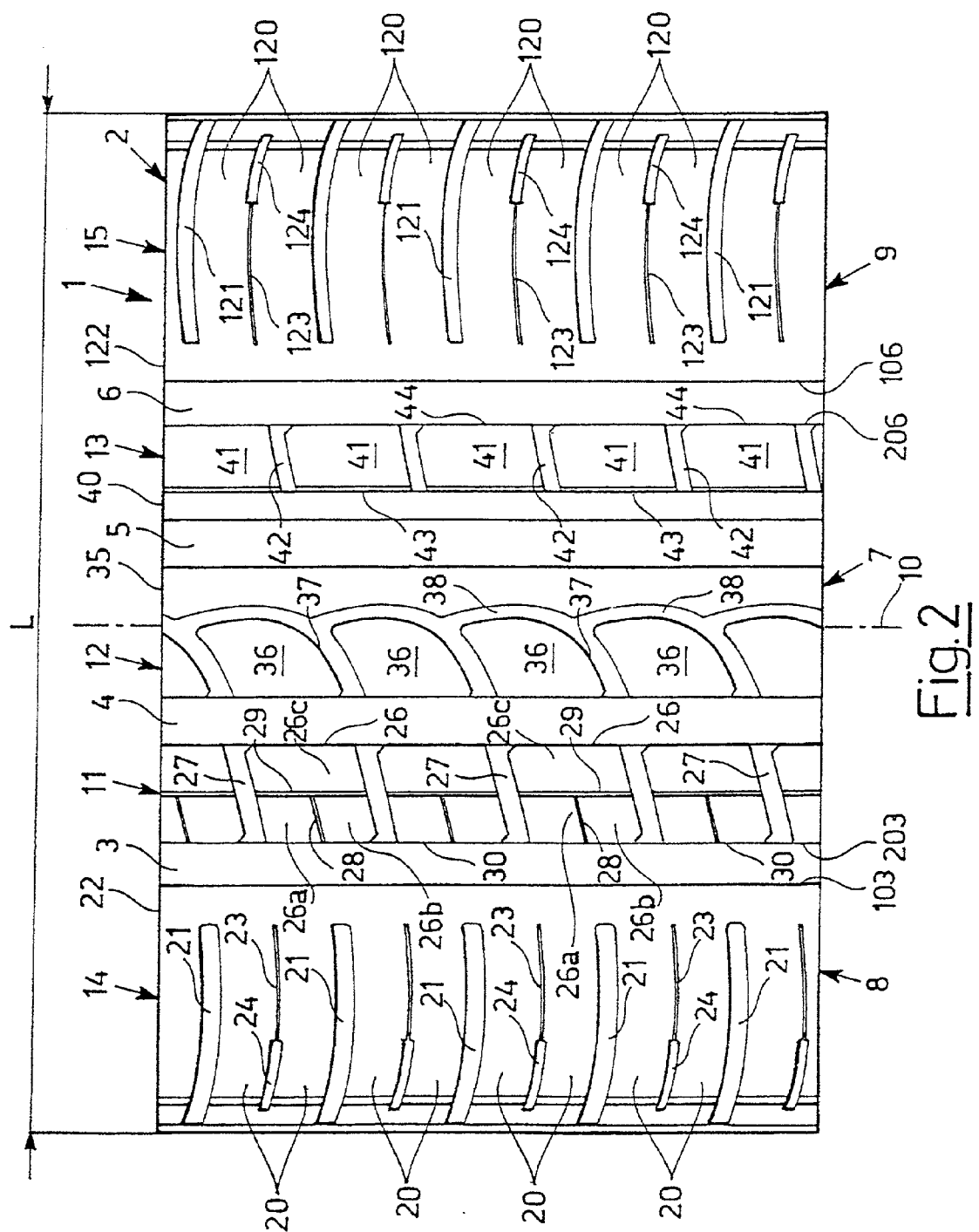
FIG. 2 is a partial plan view of a tread of the tire shown in FIG. 1.

FIG. 1 shows a high-performance tire 1 for a motor vehicle. Tyre 1 is of the asymmetrical type. In other words, it has a tread pattern that appears different (i.e. asymmetric) on one side of equatorial plane 10 from the other side (FIG. 2).

The structure of the tire is of the conventional type and comprises a carcass, a tread band located on the crown of said carcass, a pair of axially superimposed sidewalls terminating in beads reinforced with bead wires and corresponding bead fillers, for securing said tire to a corresponding mounting rim. The tire preferably also comprises a belt structure interposed between the carcass and the tread band. More preferably, the tire of the type with a markedly flattened section, for example in the range from 0.65 to 0.30, where these figures express the percentage value of the ratio between the height of the cross right section of the tire and the maximum chord of said section. In the art this ratio is usually referred to as H/C.

The carcass is reinforced with one or more carcass plies fixed to said bead wires, while the belt structure comprises two belt strips, formed from lengths of rubberized fabric incorporating metal cords, parallel to each other in each strip and crossing over those of the adjacent strips, preferably inclined symmetrically with respect to the equatorial plane, and radially superimposed on each other. Preferably, the carcass also comprises a third belt strip, in a radially outermost position, provided with cords, preferably textile and even more preferably made from heat-shrinkable material, orientated circumferentially, i.e. at zero degrees with respect to said equatorial plane.

Tire 1 has a tread 2 made from a predetermined compound, provided with deep circumferential grooves 3, 4, 5 and 6. Grooves 3 and 6 divide a central region 7 of the tread from two shoulder regions 8 and 9, located respectively on the left and on the right of equatorial plane 10.

Central region 7 comprises three circumferential rows of blocks 11, 12 and 13. Shoulder region 8 comprises a circumferential row of blocks 14 and shoulder region 9 comprises a circumferential row of blocks 15.

The row of blocks 14 comprises shoulder blocks 20, of approximately rectangular shape, separated from each other by transverse grooves 21. Each block 20 has a sipe 23 which is approximately transverse with respect to equatorial plane 10 and is aligned with a transverse recess 24 towards the outer edge of the tread. Blocks 20 are joined at one end by a continuous annular track 22 which terminates in a continuous wall 103 which forms a lateral wall of groove 3.

The row of blocks 11 is delimited by circumferential grooves 3 and 4. Row 11 comprises outer central blocks 26 of an approximately rhomboid shape, separated from each other by transverse grooves 27. Blocks 26 are divided into three portions 26a, 26b and 26c. The two portions 26a and 26b are separated by an approximately transverse sipe 28, are axially adjacent to third portion 26c and are separated from the latter by a circumferential recess 29. Blocks 26 terminate in walls 30 which form a notched lateral wall 203 of groove 3.

For example, groove 3 has a width of approximately 10.5 mm and a depth of approximately 8 mm and its lateral walls 103 and 203 are inclined at approximately 5° with respect to a centre-line axis, and are joined by a bottom radius of approximately 4.5 mm.

The row of blocks 12 is delimited on one side by circumferential groove 4 and is adjacent, on the opposite side, to an annular projection 35, which in turn is delimited by circumferential groove 5. Row 12 comprises inner central blocks 36 of approximately semi-parabolic shape, separated from each other by approximately transverse grooves 37, and separated from projection 35 by a circumferential groove 38 which has a half-wave harmonic course.

The row of blocks 13 is delimited by circumferential groove 6 and is adjacent to an annular projection 40, which, in turn, is delimited by annular groove 5. Row 13 comprises outer central blocks 41 of approximately rhomboid shape, separated from each other by transverse grooves 42. Each block 41 is separated from projection 40 by a circumferential recess 43. Blocks 41 terminate in walls 44 which form a notched lateral wall 206 of groove 6.

The row of blocks 15 comprises shoulder blocks 120, of approximately rectangular shape, separated from each other by transverse grooves 121. Each block 120 has an approximately transverse sipe 123, aligned with a transverse recess 124 towards the outer edge of the tread. Blocks 120 are joined at one end by a continuous annular track 122 which terminates in a continuous wall 106 which forms a lateral wall of groove 6.

Preferably the two shoulder regions have different widths from each other; for example, the narrower shoulder 8 (on the vehicle side) has a width of approximately 25% of the total width of the tread, while the wider shoulder 9 (preferably on the outer side) has a width of approximately 28% of the total width of the tread.

Figure 3:
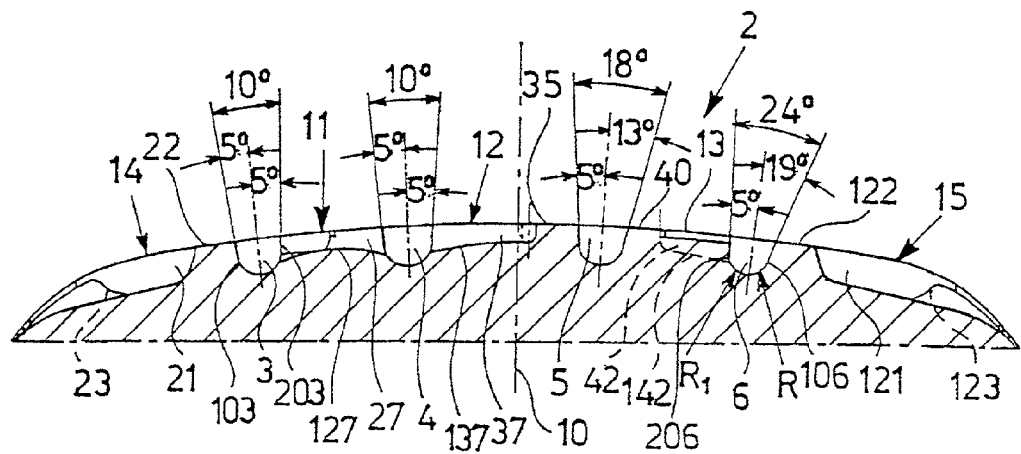
FIG. 3 is a view in partial section, in a radial plane, of the tire shown in FIG. 1.
Figure 6:
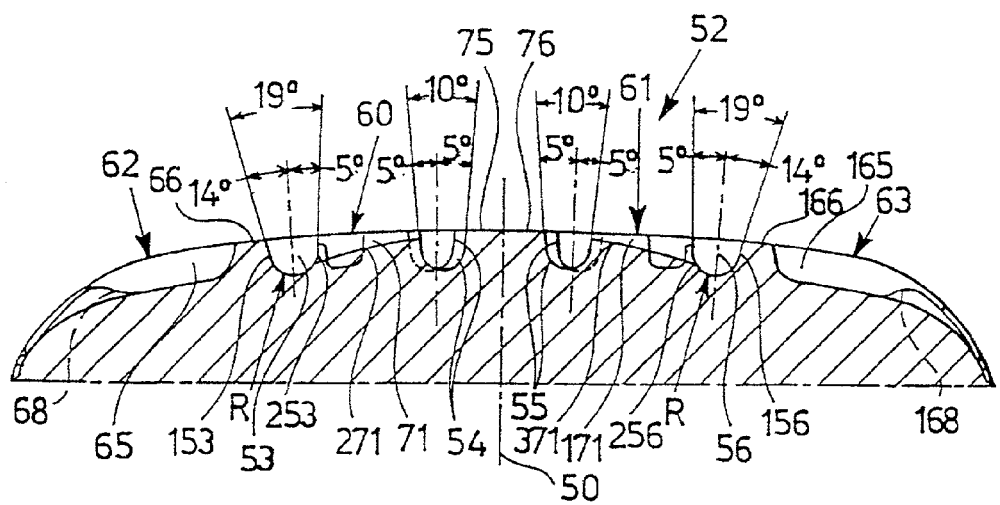
FIG. 6 is a view in partial section, in a radial plane, of the tire shown in FIG. 4.

Continuous lateral wall 106 of groove 6 has a profile, in the radial plane (FIG. 3), which is more inclined with respect to a centre-line axis of the groove, in other words which is more bulky, than the profile of facing lateral wall 206. For example, groove 6 has a width of approximately 10.5 mm and a depth of approximately 8 mm, and wall 106 has an inclination of approximately 19° with respect to its centre-line axis and a bottom radius R of approximately 3.5 mm, while wall 206 has an inclination of approximately 5° with respect to the centre-line axis and a bottom radius R1 of approximately 5 mm.

The presence of continuous track 122 imparts optimal rolling to tire 1, since it prevents the formation, as a result of wear, of "saw tooth" wear deformations on the edges of transverse grooves 121 and of sipes 123, which would give rise to noise and discomfort in travel.

The particular shape of groove 6, located on the outer edge of the tread, i.e. on the side which is on the exterior of the vehicle when fitted, also makes it possible to improve the wear-resistance of the shoulder of the tire during severe use in cornering (at high speeds and radii), thus significantly reducing premature wear, particularly of the "saw tooth" wear phenomenon type, on the edges of the circumferential groove. This minimizes the usual degradation of the performance of the tire due to wear.

Transverse grooves 27 of the row of blocks 11 have a bottom wall 127 (FIG. 3) which has a cambered profile in a radial plane.

Preferably, this profile is of the curvilinear type and extends approximately along an arc whose shape is chosen in such a way as to promote the migration of the compound according, for example, to the viscosity of said compound, which is preferably in the range from 40 ML(1+4) to 110 ML(1+4) (Mooney viscosity), according to information which will be familiar to those skilled in the art. Preferably, this curvilinear profile has a radius of curvature in the range from 25 to 110 mm.

Transverse grooves 37 of the row of blocks 12 have a bottom wall 137 with an inclined profile decreasing towards circumferential groove 4. Preferably, this inclined profile has a moderately curvilinear form with a radius of curvature in the range from 90 to 120 mm.

Also transverse grooves 42 of the row of blocks 13 have a bottom wall 142 with an inclined profile decreasing towards groove 6. Preferably, said inclined profile has a moderately curvilinear form with a radius of curvature in the range from 90 to 120 mm.

This configuration with variable depths of the profiles of bottom walls 127, 137 and 142 of transverse grooves 27, 37 and 42 promotes a uniform distribution of the tread compound during vulcanization in an suitable mould, since it facilitates the longitudinal migration of said tread compound along the pitch sequence of the pattern. In this way, non-homogenous and unbalanced distributions of the masses are prevented.

For example, in a 225/40 ZR 18 tire, tread 2 has a width L of approximately 243 mm, shoulder region 8 has a width of approximately 61.5 mm, and shoulder region 9 has a width of approximately 67.5 mm.

Each block 120 of row 15 is produced by rotating of 180° a block 20 of row 14 about an axis lying in the plane of the sheet and passing through equatorial plane 10. The block thus produced is then turned over through 180° with respect to an axis lying in the plane of the sheet and perpendicular to equatorial plane 10.

The pattern of tread 2 has four different pitch values distributed along the extension of the tread according to a predetermined pitch sequence. Each pitch represents the length, in a predetermined circumferential direction, of one block and of the adjacent transverse groove; for example, a block 20 or 120 and adjacent groove 21 or 121. The pitch sequence is produced according to the invention of U.S. Pat. No. 5,371,685, in order to modulate the noise emitted by the tire and, in particular, to avoid a siren effect (the presence of resonant phenomena, particularly at high frequency).

Figure 4:
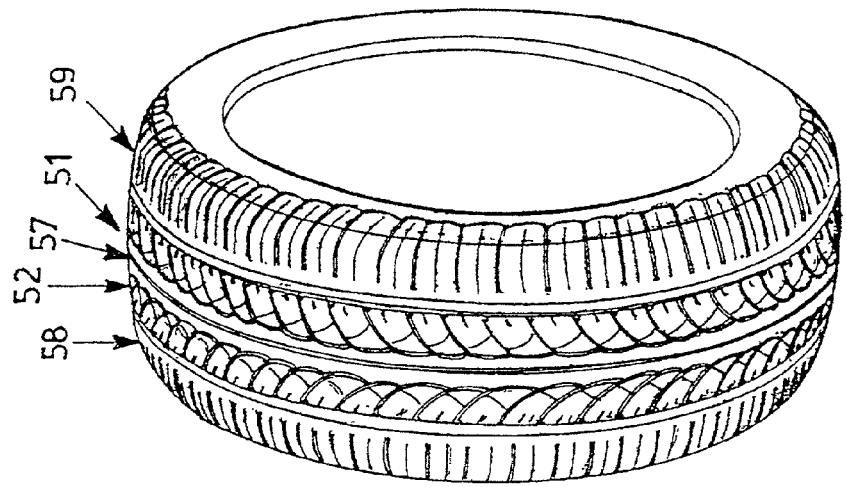
FIG. 4 is a perspective view of another tire according to the invention.
Figure 5:
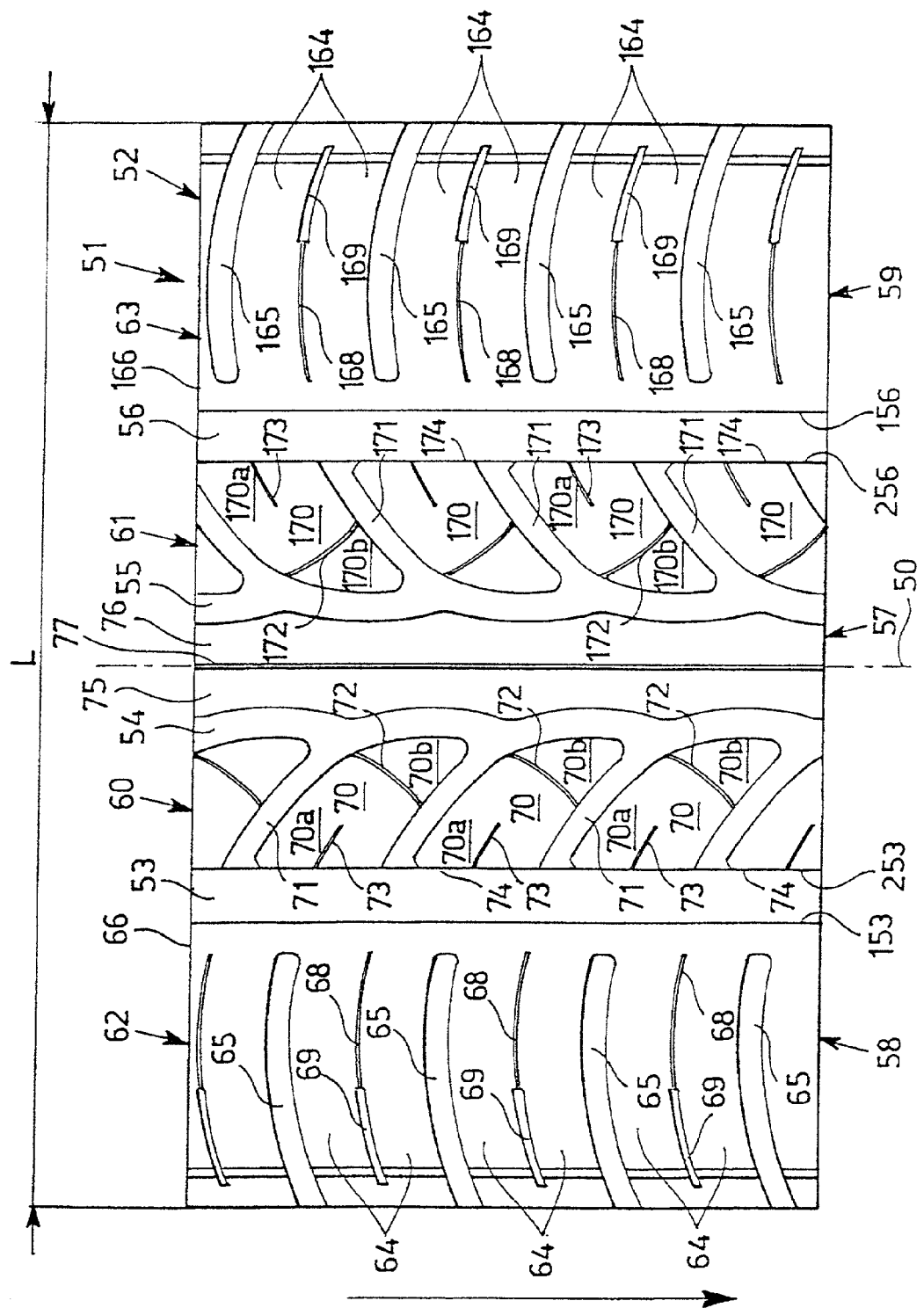
FIG. 5 is a partial plan view of a tread of the tire shown in FIG. 4.

FIG. 4 shows a high-performance tire 51 for a motor vehicle. Tyre 51 is of the directional type in other words, it has a tread pattern which is symmetrical about equatorial plane 50 (FIG. 5).

Tyre 51 has a tread 52 made from a predetermined compound, provided with deep, circumferential grooves 53, 54, 55 and 56. Grooves 53 and 56 divide a central region 57 of the tread from two shoulder regions 58 and 59, located respectively on the left and on the right of equatorial plane 50. Circumferential grooves 54 and 55 have a half-wave harmonic course.

Central region 57 comprises two circumferential rows of blocks 60 and 61. Shoulder region 58 has a circumferential row of blocks 62 and shoulder region 59 has a circumferential row of blocks 63.

The row of blocks 62 comprises shoulder blocks 64, of approximately rectangular shape, separated from each other by transverse grooves 65. Each block 64 has an approximately transverse sipe 68 aligned with a transverse recess 69 towards the outer edge. Blocks 64 are joined at one end by a continuous annular track 66 which terminates in a continuous wall 153 which forms a lateral wall of groove 53.

The row of blocks 60 is delimited by circumferential grooves 53 and 54, and comprises central blocks 70 which are approximately cusp-shaped. Blocks 70 are separated from each other by approximately transverse grooves 71 and are divided into two portions 70a and 70b by a curved notch 72. Portion 70a has an approximately transverse sipe 73. Blocks 70 terminate in walls 74 which form a notched wall 253 of groove 53. Transverse grooves 71 have a bottom wall 271 with an inclined profile decreasing towards circumferential groove 53.

Continuous lateral wall 153 of groove 53 has a profile in a radial plane which is more inclined with respect to a centre-line axis of the groove, in other words which is more bulky, than the profile of facing lateral wall 253. For example, groove 53 has a width of approximately 12 mm and a depth of approximately 8 mm, and the wall 153 has an inclination of approximately 14° with respect to a centre-line axis and a bottom radius R of approximately 4.5 mm, while wall 253 has an inclination of approximately 5° with respect to the centre-line axis.

Central region 57 also comprises two annular projections 75 and 76 located on the left and on the right of equatorial plane 50. Projection 75 is delimited by half-wave annular groove 54 and by a circumferential recess 77. Projection 76 is delimited by circumferential recess 77 and by half-wave annular groove 55.

The row of blocks 61 is delimited by circumferential grooves 55 and 56, and comprises central blocks 170 which are mirror images of and out of alignment with blocks 70. Blocks 170 are separated from each other by transverse grooves 171 and are divided into two portions 170a and 170b by a thin curved notch 172. Portion 170a has an approximately transverse sipe 173. Blocks 170 terminate in walls 174 which form a notched wall 256 of groove 56. Transverse grooves 171 have a bottom wall 371 with an inclined profile decreasing towards circumferential groove 56.

The row of blocks 63 comprises shoulder blocks 164 which are mirror images of and out of alignment with blocks 64. Shoulder blocks 164 are of approximately rectangular shape and are separated from each other by transverse grooves 165. Each block 164 has an approximately transverse sipe 168 aligned with a transverse recess 169 towards the outer edge. Blocks 164 are joined at one end by a continuous annular track 166 which terminates in a continuous wall 156 which forms a lateral wall of groove 56.

Continuous lateral wall 156 of groove 56 has the same profile (identical and a mirror image) and the same dimensions as continuous lateral wall 153 of groove 53.

For example, in a 225/40 ZR 18 tire, tread 52 has a width L of approximately 237 mm and shoulder regions 58 and 59 have each a width of approximately 73 mm.

Specimens of tires 1 and 51 were made and were shown to have excellent performance (comfort, quietness, resistance to aquaplaning and to wear) by tests of comparison with conventional tires conducted both in the laboratory (indoor tests) and on the road and track.

The tires according to the invention were compared with the PZero tire made by the Applicant, which at present is considered to be the reference standard by motor vehicle manufacturers, and with equivalent tires which represent commercially available alternative types of both asymmetric and directional tires. Furthermore, the tire of the present invention has been compared with two commercial tires selected among the most sold ones. The first was an asymmetric tire referred to hereinafter as $C_1$ and the second was a directional tire referred to hereinafter as $C_2$.

The vehicle used for the tests was a Porsche Carrera 996 fitted, depending on the type of test to be conducted, with four asymmetric tires or, alternatively, with directional tires on the front wheels and asymmetric tires on the rear wheels. The tires fitted on the front wheels were of the 225/40 ZR 18 type, and those fitted on the rear wheels were of the 265/35 ZR 18 type.

The tires were fitted on standard rims and were inflated to the nominal operating pressure.

Comfort Test with Totally Asymmetric Fitting.

Given that the used assessment scale ran from −3 to +3 and represented a subjective judgement expressed by the test driver who tested and compared in sequence all the fittings on a route that was mixed in terms of the type of road layout (motorway, ordinary road, straight, twisting), the road surface (smooth, rough) and the speed of travel, the results were as follows:

|  | Invention | PZero | $C_1$ |
|---|---|---|---|
| Plastic comfort | 1.2 | 1.2 | 0.6 |
| Acoustic comfort | 1 | 0.6 | 1 |

In this type of test, plastic comfort was evaluated according to the set of sensations perceived by the test driver with respect to the tire's capacity for absorbing rough areas of the road surface.

Also, in this type of test, "acoustic comfort" denotes the noise perceived by the test driver inside the passenger compartment.

Obstacle Test.

The test consisted in making the tire, loaded with the nominal operating load, to rotate against a road wheel mounted with a vertical axis of rotation and rotating at a speed in the range from 150 km/h to 0 km/h. The road wheel carries on its radially outer surface a bar of parallelepipedal shape of predetermined dimensions which forms the obstacle, The tire is fitted on a fixed dynamometer hub which measures the excitation (force at the hub) that the obstacle produces on the tire.

The test yielded the three-dimensional diagrams of the amplitude of the force as a function of speed and frequency. Areas which could be characterized by ranges of speed and frequency were selected from these diagrams and the root mean square value of amplitude (expressed in kg) which forms a parameter predicting the plastic comfort characteristics of the tire was calculated for each of these areas.

| a) Asymmetric tyre | | |
|---|---|---|
| Root mean square value | Invention | $C_1$ |
| Radial | 45 | 48 |
| Longitudinal | 53 | 62 |

| b) Directional tyre | | |
|---|---|---|
| Root mean square value | Invention | $C_2$ |
| Radial | 44 | 50 |
| Longitudinal | 51 | 61 |

The range of measurement of the root mean square value in the radial direction of the tire was from 20 Hz to 40 Hz with a speed decreasing from 120 km/h to 10 km/h.

The range of measurement of the root mean square value in the longitudinal direction of the tire was from 60 Hz to 140 Hz with a speed decreasing from 120 km/h to 10 km/h.

In the obstacle test, the assessment expressed by the test driver in the evaluation of the plastic comfort improved as the root mean square value, such as that of the tires according to the invention, decreased.

Straight-Line Aquaplaning Test.

The test was conducted on a straight section of smooth asphalt of predetermined length with a film of water of predetermined constant depth which was automatically restored whenever the test vehicle passed through it. In a first step, the speed (km/h) at which the tires started to lose adhesion was measured (V1); in a second step, the speed (km/h) at which there was total loss of adhesion was measured (V2).

| a) Asymmetric tyre | | |
|---|---|---|
|  | Invention | PZero | $C_1$ |
| V1 | 86.5 | 83 | 86 |
| V2 | 90.5 | 87 | 90.5 |

-continued b) Directional tyre

|  | Invention | $C_2$ |
|---|---|---|
| V1 | 87 | 87.5 |
| V2 | 92.5 | 91 |

Cornering Aquaplaning Test.

The test was conducted on a section of route with smooth and dry asphalt on a bend of constant radius having a predetermined length and having, in a final section, an area of predetermined length covered with a film of water of predetermined thickness.

During the test, the maximum centrifugal acceleration and the maximum speed of the vehicle corresponding to complete aquaplaning were measured. The table shows the values of acceleration and speed expressed as a percentage, the value for the reference tire (PZero) being set at 100 in each case.

a) Asymmetric tyre

|  | Invention | PZero | $C_1$ |
|---|---|---|---|
| Max. acceleration | 109 | 100 | 113 |
| Max. speed | 106 | 100 | 105 | b) Directional tyre

|  | Invention | PZero | $C_2$ |
|---|---|---|---|
| Max. acceleration | 122 | 100 | 111 |
| Max. speed | 110 | 100 | 106 |

Noise Test.

Tests were conducted in a chamber acoustically insulated from the exterior (semi-anechoic chamber) with a Porsche car, as specified above, fitted first with new tires according to the invention and then with new commercial comparison tires.

Figure 7:
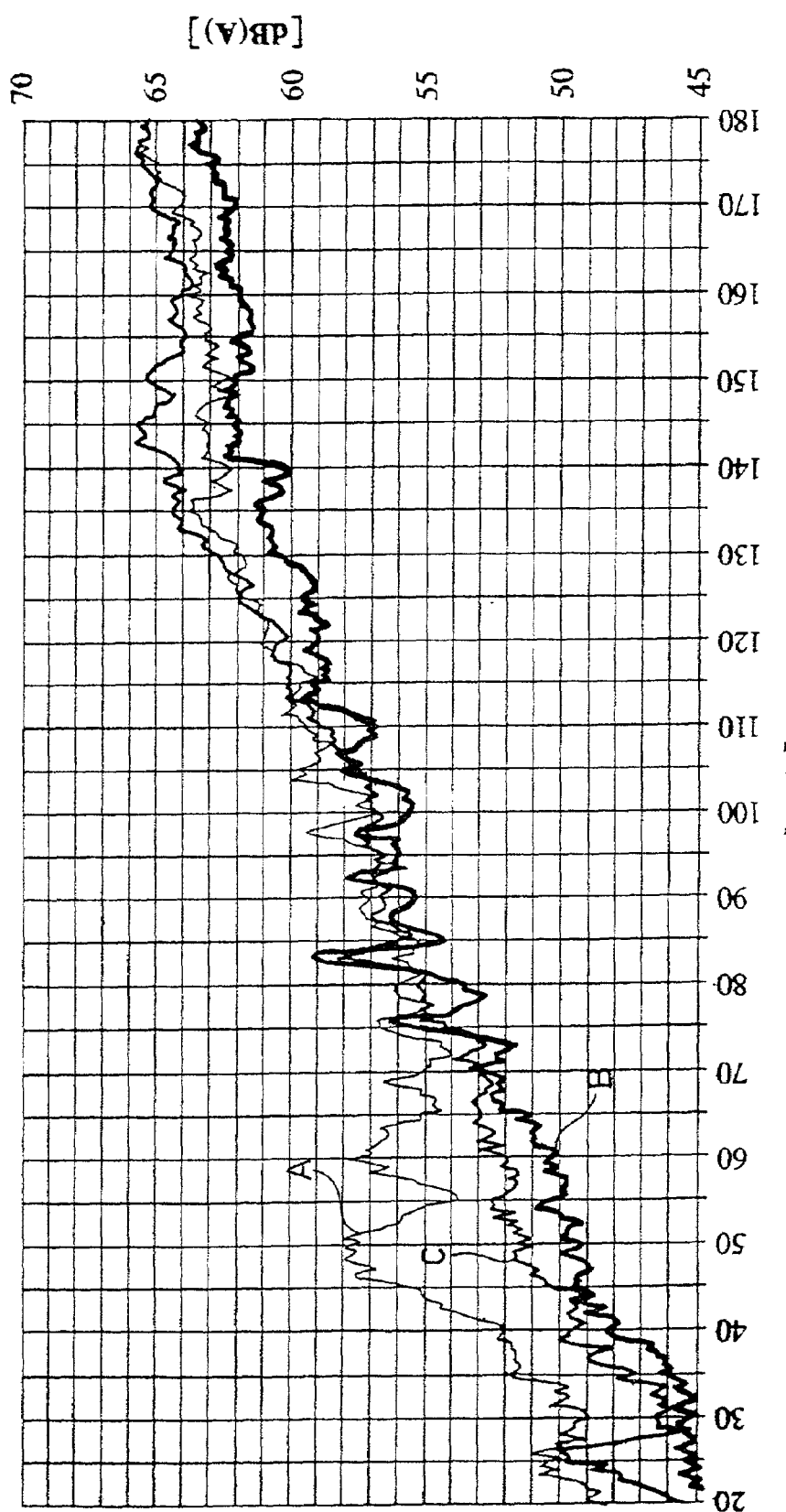
FIGS. 7 and 8 are diagrams which show the variation of the noise level as a function of speed, measured in a vehicle fitted with tires according to the invention and with conventional tires.
Figure 8:
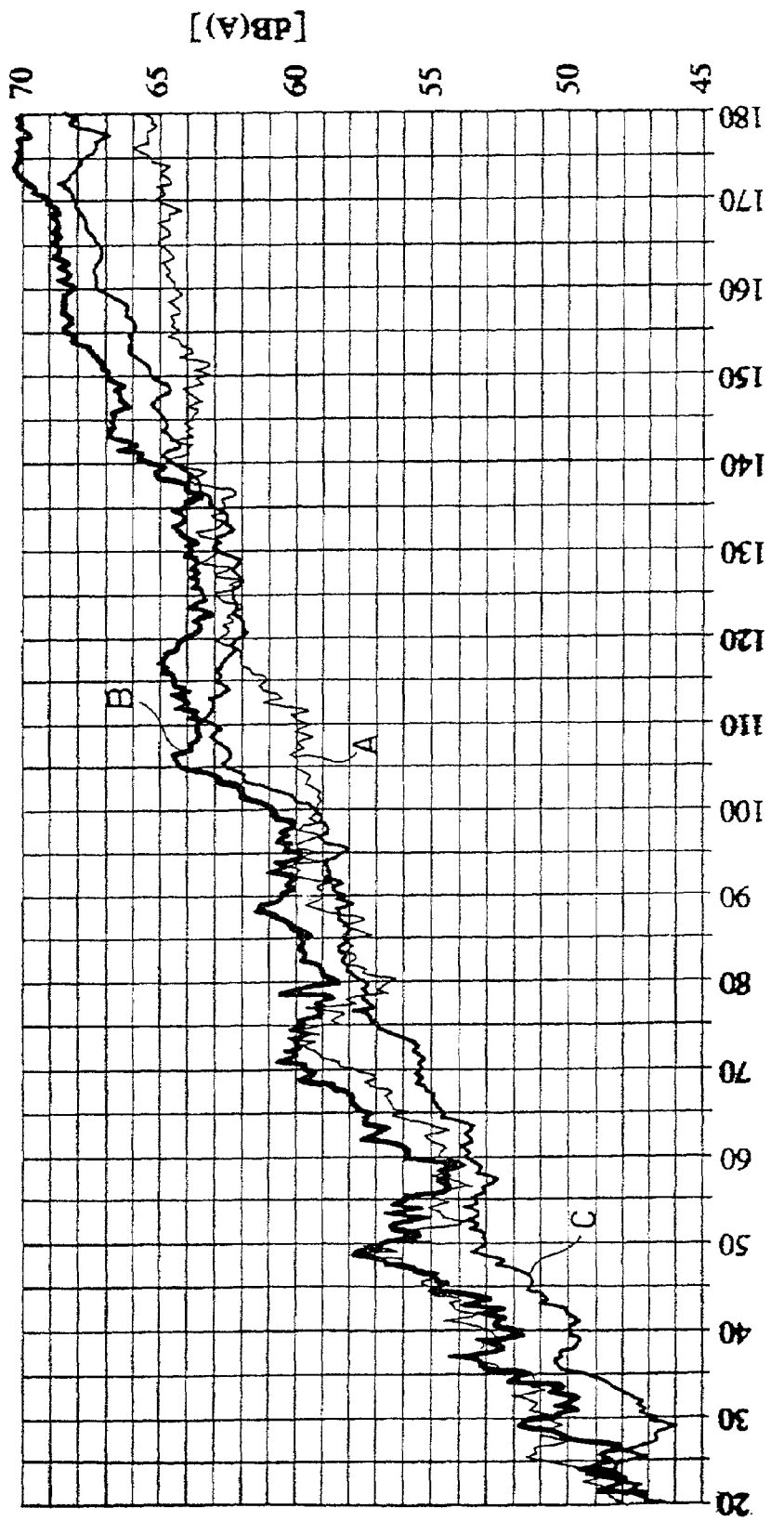

FIGS. 7 and 8 show the graphs of noise inside the vehicle (dB(A)) as a function of the decreasing speed from 180 to 20 km/h, for a front left-hand tire and a rear left-hand tire respectively. More particularly, the curve A relates to the commercial comparison tire and the curve B relates to the tire according to the invention.

Noise tests on the road were carried out on the same vehicle fitted with the aforesaid new tires, and the results were expressed according to the subjective evaluation of the test driver. The evaluation of the tires according to the invention and the commercial comparison ones was 7, where the limit of acceptability of new tires is 6.

The noise test on the road was repeated, only for the vehicle fitted with the tires according to the invention, at successive mileage intervals, with the following results:

after 3,240 km, the noise level was 6.5;
after 6,840 km, the noise level was 6;
after 10,800 km, the noise level was 6.

At this point the tires were returned to the semi-anechoic chamber, where the noise values shown by curves C of FIGS. 7 and 8 were measured.

The data confirm that the tire according to the invention, in spite of degradation, maintains a noise level equal to the threshold of acceptability of new tires, even after 10,800 km of use.

During this period of use, it was also found that the wear, particularly on the shoulders, was considerably reduced: the tire was found to be practically free of signs of premature and uneven wear, specifically of the "saw tooth" wear phenomenon type.

Figure 9:
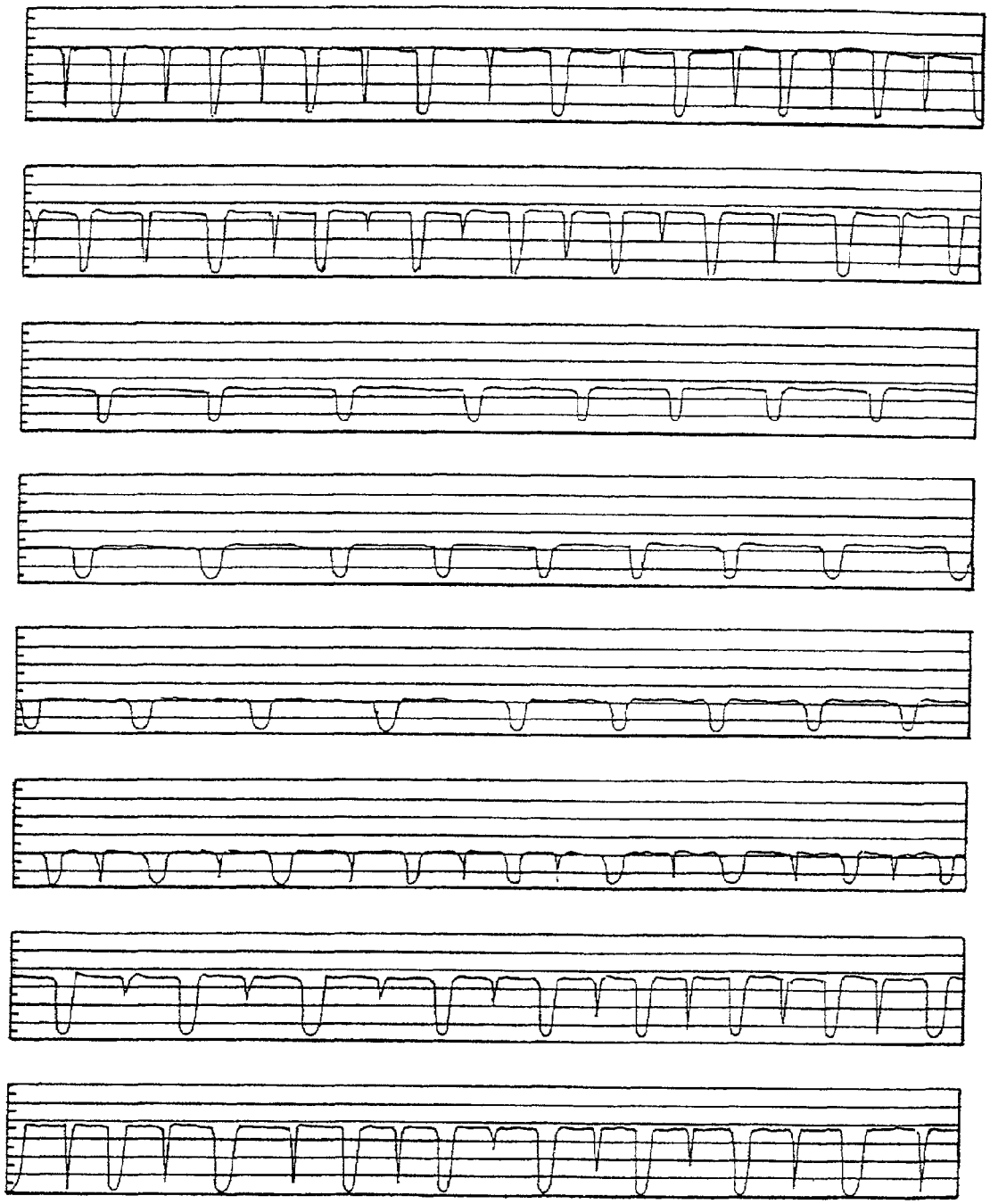
FIG. 9 shows the profile of blocks of a tread of a tire according to the invention along an axial sequence of meridian planes, reconstructed by a laser beam after a certain period of use.

In particular, the measurements of tread wear were carried out at the same time as the noise tests and the results are shown in the attached graphs (FIG. 9) which represent the profile of the blocks, along an axial sequence of meridian planes, reconstructed by a laser beam. The measurements shown in FIG. 9 were made after 10,800 km of use of the 225/40 ZR 18 tire. The first two profiles relate to the blocks of the right-hand shoulder, the profiles of the third to the sixth relate to the blocks of the central rows, and the last two profiles relate to the blocks of the left-hand shoulder.

Each graph shows a portion of the circumferential extension of the tire where it will be noted that the decrease of the height of the blocks due to wear takes place in a practically uniform way on the periphery of each block and in all of the blocks.

The invention claimed is:

1. A high-performance, asymmetric tire for a motor vehicle, comprising:
  a carcass; and
  a tread band;
  wherein the carcass comprises a crown portion and two axially opposite sides terminating in beads for mounting the tire on a corresponding rim,
  wherein the carcass comprises at least one carcass ply,
  wherein the tread band is disposed on the crown portion of the carcass,
  wherein the tread band comprises a pattern, comprising:
    a central region;
    first and second shoulder regions; and
    first, second, third, and fourth circumferential grooves;
  wherein the first circumferential groove divides the first shoulder region from the central region,
  wherein the fourth circumferential groove divides the central region from the second shoulder region,
  wherein the first shoulder region comprises first shoulder blocks, separated from each other by first transverse grooves substantially perpendicular to a circumferential direction of the tire, but joined to each other along axially inner ends of the first shoulder blocks by a first circumferential portion,
  wherein the central region comprises:
    a row of inner central blocks;
    first and second rows of outer central blocks; and
    first and second annular projections;
  wherein the outer central blocks of the first row are delimited on axially opposite sides by the first and second circumferential grooves,
  wherein the inner central blocks are delimited on one axial side by the second circumferential groove,
  wherein the third circumferential groove separates the first and second annular projections,
  wherein the outer central blocks of the second row are adjacent on one axial side to the second annular projection and are delimited, on an axially opposite side, by the fourth circumferential groove, and
  wherein the second shoulder region comprises second shoulder blocks, separated from each other by second transverse grooves substantially perpendicular to a circumferential direction of the tire, but joined to each other along axially inner ends of the second shoulder blocks by a second circumferential portion.

2. The tire of claim 1, further comprising:
a circumferentially inextensible belt structure;
wherein the belt structure is interposed between the carcass and the tread band.

3. The tire of claim 2, wherein the belt structure comprises:
first and second radially superimposed belt strips;
wherein the first and second belt strips are formed of rubberized fabric incorporating metallic cords that are parallel to each other within a respective belt strip,
wherein the metallic cords of the first and second belt strips are inclined with respect to an equatorial plane of the tire, and
wherein the metallic cords of the first belt strip cross the metallic cords of the second belt strip.

4. The tire of claim 2, wherein the belt structure comprises:
first, second, and third radially superimposed belt strips;
wherein the first and second belt strips are formed of rubberized fabric incorporating metallic cords that are parallel to each other within a respective belt strip,
wherein the metallic cords of the first and second belt strips are inclined with respect to an equatorial plane of the tire,
wherein the metallic cords of the first belt strip cross the metallic cords of the second belt strip,
wherein the third belt strip is radially external to the first and second belt strips, and
wherein the third belt strip is formed of a plurality of circumferential cord coils disposed in axial side-by-side relationship at a substantially zero angle with respect to the equatorial plane of the tire.

5. The tire of claim 1, wherein the outer central blocks of the first row are separated from each other by third transverse grooves.

6. The tire of claim 1, wherein the inner central blocks are separated from each other by fourth transverse grooves.

7. The tire of claim 1, wherein the outer central blocks of the second row are separated from each other by fifth transverse grooves.

8. The tire of claim 1, wherein the outer central blocks of the first row are separated from each other by third transverse grooves,
wherein the inner central blocks are separated from each other by fourth transverse grooves, and
wherein the outer central blocks of the second row are separated from each other by fifth transverse grooves.

9. The tire of claim 1, wherein a sum of widths of the first and second shoulder regions is less than or equal to 60% of an overall width of the tread band, and
wherein the width of each of the first and second shoulder regions is not less than 20% of the overall width of the tread band.

10. The tire of claim 1, wherein a lateral wall of at least one of the first and fourth circumferential grooves has a profile, in a radial plane, that is inclined more with respect to a centerline axis of the respective circumferential groove than a profile of a facing lateral wall of the respective circumferential groove.

11. The tire of claim 1, wherein a lateral wall of at least one of the first and fourth circumferential grooves is inclined at an angle between about 14° and about 24° with respect to a centerline axis of the respective circumferential groove, and
wherein a facing lateral wall of the respective circumferential groove is inclined at an angle between about 3° and about 10° with respect to the centerline axis of the respective circumferential groove.

12. The tire of claim 1, wherein the blocks in one or more of the rows of central blocks are separated from each other by transverse grooves having a bottom wall with a shaped profile of variable depth.

13. The tire of claim 12, wherein the bottom wall of the transverse grooves separating the blocks in the one or more of the rows of central blocks has an inclined profile decreasing towards one of the first and fourth circumferential grooves.

14. The tire of claim 1, wherein at least one of the shoulder blocks comprises a sipe that is approximately transverse with respect to an equatorial plane of the tire.

15. The tire of claim 1, wherein the outer central blocks of the first row are approximately rhomboid-shaped.

16. The tire of claim 1, wherein the inner central blocks are approximately cusp-shaped.

17. The tire of claim 1, wherein the inner central blocks are approximately semiparabolic-shaped.

18. The tire of claim 1, further comprising:
a fifth circumferential groove;
wherein the fifth circumferential groove separates the inner central blocks and the first annular projection.

19. The tire of claim 18, wherein the fifth circumferential groove comprises a half-wave harmonic course.

20. The tire of claim 1, wherein the inner central blocks are adjacent, on an axially opposite side, to the first annular projection.

21. The tire of claim 1, wherein a first circumferential recess divides each outer central block of the first row.

22. The tire of claim 1, wherein a second circumferential recess separates the outer central blocks of the second row from the second annular projection.

23. The tire of claim 1, wherein each of the first shoulder blocks comprises a sipe that is approximately transverse with respect to an equatorial plane of the tire.

24. The tire of claim 1, wherein each of the second shoulder blocks comprises a sipe that is approximately transverse with respect to an equatorial plane of the tire.

25. The tire of claim 1, wherein each of the shoulder blocks comprises a sipe that is approximately transverse with respect to an equatorial plane of the tire.

26. A high-performance, directional tire for a motor vehicle, comprising:
a carcass; and
a tread band;
wherein the carcass comprises a crown portion and two axially opposite sides terminating in beads for mounting the tire on a corresponding rim,
wherein the carcass comprises at least one carcass ply,
wherein the tread band is disposed on the crown portion of the carcass,
wherein the tread band comprises a pattern, comprising:
a central region;
first and second shoulder regions; and
first, second, third, and fourth circumferential grooves;
wherein the first circumferential groove divides the first shoulder region from the central region,
wherein the fourth circumferential groove divides the central region from the second shoulder region,
wherein the first shoulder region comprises first shoulder blocks, separated from each other by first transverse grooves substantially perpendicular to a circumferential direction of the tire, but joined to each other along axially inner ends of the first shoulder blocks by a first circumferential portion, wherein the central region comprises:
first and second rows of central blocks; and
a central annular projection;
wherein the central blocks of the first row are delimited on one axial side by the first circumferential groove,
wherein the second circumferential groove separates the central blocks of the first row from the central annular projection,
wherein the second circumferential groove is immediately adjacent to the central annular projection,
wherein the central blocks are approximately cusp-shaped,
wherein the third circumferential groove is immediately adjacent to the central annular projection,
wherein the third circumferential groove separates the central annular projection from the central blocks of the second row,
wherein the central blocks of the second row are delimited on one axial side by the fourth circumferential groove, and
wherein the second shoulder region comprises second shoulder blocks, separated from each other by second transverse grooves substantially perpendicular to a circumferential direction of the tire, but joined to each other along axially inner ends of the second shoulder blocks by a second circumferential portion.

27. The tire of claim 26, further comprising:
a circumferentially inextensible belt structure;
wherein the belt structure is interposed between the carcass and the tread band.

28. The tire of claim 27, wherein the belt structure comprises:
first and second radially superimposed belt strips;
wherein the first and second belt strips are formed of rubberized fabric incorporating metallic cords that are parallel to each other within a respective belt strip,
wherein the metallic cords of the first and second belt strips are inclined with respect to an equatorial plane of the tire, and
wherein the metallic cords of the first belt strip cross the metallic cords of the second belt strip.

29. The tire of claim 27, wherein the belt structure comprises:
first, second, and third radially superimposed belt strips;
wherein the first and second belt strips are formed of rubberized fabric incorporating metallic cords that are parallel to each other within a respective belt strip,
wherein the metallic cords of the first and second belt strips are inclined with respect to an equatorial plane of the tire,
wherein the metallic cords of the first belt strip cross the metallic cords of the second belt strip,
wherein the third belt strip is radially external to the first and second belt strips, and
wherein the third belt strip is formed of a plurality of circumferential cord coils disposed in axial side-by-side relationship at a substantially zero angle with respect to the equatorial plane of the tire.

30. The tire of claim 26, wherein the central blocks of the first row are separated from each other by third transverse grooves.

31. The tire of claim 26, wherein the central blocks of the second row are separated from each other by fourth transverse grooves.

32. The tire of claim 26, wherein the central blocks of the first row are separated from each other by third transverse grooves, and
wherein the central blocks of the second row are separated from each other by fourth transverse grooves.

33. The tire of claim 26, wherein a sum of widths of the first and second shoulder regions is less than or equal to 60% of an overall width of the tread band, and
wherein the width of each of the first and second shoulder regions is not less than 20% of the overall width of the tread band.

34. The tire of claim 26, wherein a lateral wall of at least one of the first and fourth circumferential grooves has a profile, in a radial plane, that is inclined more with respect to a centerline axis of the respective circumferential groove than a profile of a facing lateral wall of the respective circumferential groove.

35. The tire of claim 26, wherein a lateral wall of at least one of the first and fourth circumferential grooves is inclined at an angle between about 14° and about 24° with respect to a centerline axis of the respective circumferential groove, and
wherein a facing lateral wall of the respective circumferential groove is inclined at an angle between about 3° and about 10° with respect to the centerline axis of the respective circumferential groove.

36. The tire of claim 26, wherein the central blocks in one or both of the rows are separated from each other by transverse grooves having a bottom wall with a shaped profile of variable depth.

37. The tire of claim 36, wherein the bottom wall of the transverse grooves separating the central blocks in the one or both of the rows has an inclined profile decreasing towards one of the first and fourth circumferential grooves.

38. The tire of claim 26, wherein at least one of the shoulder blocks comprises a sipe that is approximately transverse with respect to an equatorial plane of the tire.

39. The tire of claim 26, wherein a circumferential recess divides the central annular projection into first and second annular projections.

40. A high-performance, directional tire for a motor vehicle, comprising:
a carcass; and
a tread band;
wherein the carcass comprises a crown portion and two axially opposite sides terminating in beads for mounting the tire on a corresponding rim,
wherein the carcass comprises at least one carcass ply,
wherein the tread band is disposed on the crown portion of the carcass,
wherein the tread band comprises a pattern, comprising:
a central region;
first and second shoulder regions; and
first and second circumferential grooves;
wherein the first circumferential groove divides the first shoulder region from the central region,
wherein the second circumferential groove divides the central region from the second shoulder region,
wherein the first shoulder region comprises first shoulder blocks, separated from each other by first transverse grooves substantially perpendicular to a circumferential direction of the tire, but joined to each other along axially inner ends of the first shoulder blocks by a first circumferential portion,
wherein the central region comprises rows of central blocks,
wherein the second shoulder region comprises second shoulder blocks, separated from each other by second transverse grooves substantially perpendicular to a circumferential direction of the tire, but joined to each other along axially inner ends of the second shoulder blocks by a second circumferential portion, wherein the first circumferential portion forms an axially outer lateral wall of the first circumferential groove, wherein the second circumferential portion forms an axially outer lateral wall of the second circumferential groove, wherein the axially outer lateral wall of at least one of the first and second circumferential grooves has a profile, in a radial plane, that is inclined more with respect to a centerline axis of the respective circumferential groove than a profile of a facing lateral wall of the respective circumferential groove, and wherein the blocks in one or more of the rows of central blocks are separated from each other by transverse grooves having a bottom wall with an inclined profile decreasing towards one of the first and second circumferential grooves.

41. A high-performance, directional tire for a motor vehicle, comprising:
a carcass; and
a tread band;
wherein the carcass comprises a crown portion and two axially opposite sides terminating in beads for mounting the tire on a corresponding rim,
wherein the carcass comprises at least one carcass ply,
wherein the tread band is disposed on the crown portion of the carcass,
wherein the tread band comprises a pattern, comprising:
a central region;
first and second shoulder regions; and
first, second, third, and fourth circumferential grooves;
wherein the first circumferential groove divides the first shoulder region from the central region,
wherein the fourth circumferential groove divides the central region from the second shoulder region,
wherein the first shoulder region comprises first shoulder blocks, separated from each other by first transverse grooves substantially perpendicular to a circumferential direction of the tire, but joined to each other along axially inner ends of the first shoulder blocks by a first circumferential portion,
wherein the central region comprises:
first and second rows of central blocks; and
a central annular projection;
wherein the central blocks of the first row are delimited on one axial side by the first circumferential groove,
wherein the second circumferential groove separates the central blocks of the first row from the central annular projection,
wherein the second circumferential groove is immediately adjacent to the central annular projection,
wherein the central blocks are approximately semiparabolic-shaped,
wherein the third circumferential groove is immediately adjacent to the central annular projection,
wherein the third circumferential groove separates the central annular projection from the central blocks of the second row,
wherein the central blocks of the second row are delimited on one axial side by the fourth circumferential groove, and
wherein the second shoulder region comprises second shoulder blocks, separated from each other by second transverse grooves substantially perpendicular to a circumferential direction of the tire, but joined to each other along axially inner ends of the second shoulder blocks by a second circumferential portion.

42. The tire of claim 41, wherein a circumferential recess divides the central annular projection into first and second annular projections.

43. A high-performance, directional tire for a motor vehicle, comprising:
a carcass; and
a tread band;
wherein the carcass comprises a crown portion and two axially opposite sides terminating in beads for mounting the tire on a corresponding rim,
wherein the carcass comprises at least one carcass ply,
wherein the tread band is disposed on the crown portion of the carcass,
wherein the tread band comprises a pattern, comprising:
a central region;
first and second shoulder regions; and
first, second, third, and fourth circumferential grooves;
wherein the first circumferential groove divides the first shoulder region from the central region,
wherein the fourth circumferential groove divides the central region from the second shoulder region,
wherein the first shoulder region comprises first shoulder blocks, separated from each other by first transverse grooves substantially perpendicular to a circumferential direction of the tire, but joined to each other along axially inner ends of the first shoulder blocks by a first circumferential portion,
wherein the central region comprises:
first and second rows of central blocks; and
a central annular projection;
wherein the central blocks of the first row are delimited on one axial side by the first circumferential groove,
wherein the second circumferential groove separates the central blocks of the first row from the central annular projection,
wherein the second circumferential groove is immediately adjacent to the central annular projection,
wherein the second and third circumferential grooves comprise half-wave harmonic courses,
wherein the third circumferential groove is immediately adjacent to the central annular projection,
wherein the third circumferential groove separates the central annular projection from the central blocks of the second row,
wherein the central blocks of the second row are delimited on one axial side by the fourth circumferential groove, and
wherein the second shoulder region comprises second shoulder blocks, separated from each other by second transverse grooves substantially perpendicular to a circumferential direction of the tire, but joined to each other along axially inner ends of the second shoulder blocks by a second circumferential portion.

44. The tire of claim 43, wherein a circumferential recess divides the central annular projection into first and second annular projections.

* * * * *